United States Patent [19]

Thompson

[11] 4,090,114
[45] May 16, 1978

[54] SAFETY FEATURES FOR ELECTRIC VEHICLE CONTROL

[75] Inventor: Francis T. Thompson, Murrysville, Pa.

[73] Assignee: Westinghouse Electric Corp., Pittsburgh, Pa.

[21] Appl. No.: 448,862

[22] Filed: Mar. 7, 1974

[51] Int. Cl.² .............................................. H02P 7/14
[52] U.S. Cl. .................................................... 318/139
[58] Field of Search ............... 318/139, 269, 309, 332, 318/334, 341, 350, 434, 461, 465, 473, 474, 476

[56] References Cited

U.S. PATENT DOCUMENTS

| | | | |
|---|---|---|---|
| 3,527,991 | 9/1970 | Sackin | 318/473 X |
| 3,546,548 | 12/1970 | Wouk | 318/139 |
| 3,716,768 | 2/1973 | Mason | 318/139 |
| 3,735,220 | 5/1973 | Renner et al. | 318/139 |

Primary Examiner—Robert K. Schaefer
Assistant Examiner—W. E. Duncanson, Jr.
Attorney, Agent, or Firm—R. G. Brodahl

[57] ABSTRACT

An electric vehicle having a separately excited field controlled direct current drive motor powered by a direct current power supply wherein the field currents supplied to the drive motor and the armature currents drawn by the drive motor are responsive to safety control features provided on the electric vehicle. Speed control is provided for preventing overspeed of the drive motor by applying full-field current when the drive motor speed exceeds a selected value. If the motor speed remains above the selected maximum value and armature current remains positive, indicating the drive motor is not providing regenerative braking for the electric vehicle, then the contactor connecting the direct current power supply to the armature of the drive motor is opened. The electric vehicle is also provided with an armature current limiting means which causes full-field current to be applied if the armature current exceeds some maximum value. If the armature current remains above the selected maximum value then the armature of the direct current drive motor is disconnected from the power supply. Control of the field current is provided for limiting field current to a maximum value and assuring that a minimum value of field current is always supplied to the drive motor during operation. Throttle override is provided when the throttle is less than 5% depressed causing an increased value of field current to be supplied to the direct current drive motor, resulting in regenerative armature current flow and braking of the vehicle. The throttle control is constructed to be failsafe and demand regeneration if open circuited. Brake override of the throttle is provided on the electric vehicle so that applying the brake cancels any throttle demand signal and causes full-field current to be supplied, resulting in maximum regenerative braking. A temperature sensor is provided in the direct current drive motor which activates a control, when the temperature of the drive motor exceeds a preselected value which alters performance, so that the vehicle can only be operated at reduced performance thus allowing the drive motor to cool.

18 Claims, 9 Drawing Figures

SAFETY FEATURES FOR ELECTRIC VEHICLE CONTROL

CROSS REFERENCE TO RELATED APPLICATIONS

This application is related to the following applications: (1) U.S. patent application, Ser. No. 346,552 now U.S. Pat. No. 3,845,368; (2) U.S. patent application Ser. No. 346,199 now U.S. Pat. No. 3,915,251. (3) U.S. patent application Ser. No. 475,236 now U.S. Pat. No. 3,989,990; (4) U.S. patent application Ser. No. 437,405 now U.S. Pat. No. 4,052,647; (5) U.S. patent application Ser. No. 430,107 now U.S. Pat. No. 3,923,116.

BACKGROUND OF THE INVENTION

This invention relates to electric vehicles and more particularly to safety features for use on an electric vehicle driven by a separately excited field control direct current drive motor.

In most prior art electric vehicle speed control system a direct current (DC) chopper control and a series wound drive motor are used. The chopper is placed in series between a DC power supply and series wound drive motor. The DC chopper controls the speed of the DC series motor by controlling and interrupting the full armature current. The speed of the DC drive motor is controlled by conventional armature chopper apparatus which provides complete control of the motor over its entire speed range. A prior art DC chopper controls the time of the pulses and/or the magnitude of the pulses being fed through the armature of the DC drive motor. By varying the parameters of the drive impulses being fed to the armature of the DC drive motor, the speed of the drive motor can be varied. DC chopper control for armature current coupled with a series wound drive motor is the most common approach used for driving prior art electric vehicles. Since the chopper controls the full armature current, it must necessity be of a large size to handle the large current involved. Prior art direct current choppers which are required in the armature circuit are bulky and expensive. The conventional chopper controller since it must interrupt and control full armature current requires expensive high-powered thyristors and complicated control circuitry for switching and controlling the current in the armature circuit. Due to the large currents being interrupted, cooling of the controller is a problem. Conventional chopper controllers for armature current are also rather inefficient at low to normal operating speed.

An electronics system for controlling the torque speed characteristic and regenerative braking of a separately excited drive motor for use on electric vehicles is disclosed in cross-reference U.S. patent application Ser. No. 346,552. The torque speed characteristics can be controlled by varying the separately excited shunt field of the direct current drive motor. As disclosed in the above-mentioned application, speed of the direct current drive motor is controlled from some base speed to a maximum speed.

Safety and protection features are very important in the control of an electric vehicle. It is desirable that the safety features provided operate without conscious action by the driver to protect the vehicle from dangerous operating conditions. It is desirable to protect the vehicle and motor from overspeed, heavy overcurrent which could lead to motor damage or a possible fire, excessive field currents which could damage the motor, a stuck throttle which could cause a runaway condition, drive motor overheating which could damage the motor, and loss of field current. It is desirable that the safety features when required operate so as to reduce the operating performance of the electric vehicle while allowing continued operation of the vehicle, rather than complete shutdown of vehicle operation.

SUMMARY OF THE INVENTION

An electric vehicle driven by a separately excited field controlled direct current drive motor powered from a DC power supply is provided with various safety features for protecting the vehicle and operator from hazardous operations. The electric vehicle is provided with safety controls for limiting motor speed, armature current, field current, and motor temperature, and also is provided with controls to assure a minimum field current is applied to the drive motor during operation, and overrides to require regenerative braking when the throttle is released or the brake is applied.

The disclosed electric vehicle is provided with a drive motor speed limiter which controls the maximum speed of the drive motor. When the drive motor speed exceeds some maximum valve, throttle control is removed and full-field current is applied to the drive motor until drive motor speed falls below the maximum value. If the speed of the drive motor remains above the maximum speed and the armature current stays positive, then the direct current power supply is disconnected from the armature of the drive motor. A time delay is provided to prevent disconnecting the power supply until sufficient time has elapsed for the armature current to become negative after full-field current is applied.

Armature current is also limited to some maximum value to prevent overheating and damage to the drive motor and electrical system. If the armature current exceeds a maximum value, full-field current is demanded and any throttle signal is removed. If armature current remains above the maximum value then the DC power supply is disconnected from the armature of the drive motor. Armature current sensing means are connected to the direct current drive motor and supply a signal proportional to the value of the armature current flowing through such said current drive motor. This signal is compared with a signal proportional to the predetermined maximum armature current and when excessive, the throttle signal is cancelled and full-field current is applied resulting in regenerative braking of the electric vehicle.

Field excitation of the separately excited drive motor is controlled to limit field current to some maximum value and to assure that a minimum value of field current is always applied to the direct current drive motor during operation. The separately excited field of the direct current drive motor is excited by current pulses supplied from the vehicle control system. A minimum duration pulse is always applied to the electric vehicle during operation.

The throttle of the electric vehicle is also connected so that when depressed less than a predetermined amount such as 5%, a regenerative armature current is demanded by applying full field current. The throttle control circuit also tends to be failsafe and demands regenerative braking when open circuited. The brake is provided with an override which cancels any throttle demand signal and calls for full regenerative braking when depressed. The disclosed electric vehicle is provided with a temperature sensing means connected to the drive motor for sensing temperature of the drive motor and providing an excess temperature output signal when the temperature of the drive motor exceeds a predetermined value. When the temperature of the drive motor exceeds a predetermined value, operating characteristics of the vehicle are altered so as to permit continued operation of the motor vehicle at reduced performance. Operation of the electric vehicle is determined by comparing an armature current feedback signal with a desired armature current signal and varying the field current to make the armature current feedback signal and armature current demand signal substantially equal. An amplifier is provided in the armature current feedback circuit which is responsive to the temperature sensor so as to increase the feedback signal when the temperature of the direct current drive motor exceeds a predetermined value. Thus when motor temperature exceeds a predetermined value the direct current drive motor will be operable at a reduced performance for any throttle setting.

BRIEF DESCRIPTION OF THE DRAWINGS

For a better understanding of the invention, reference may be had to preferred embodiments exemplary of the invention shown in the accompanying drawings, in which.

DESCRIPTION OF THE PREFERRED EMBODIMENTS

Figure 1:
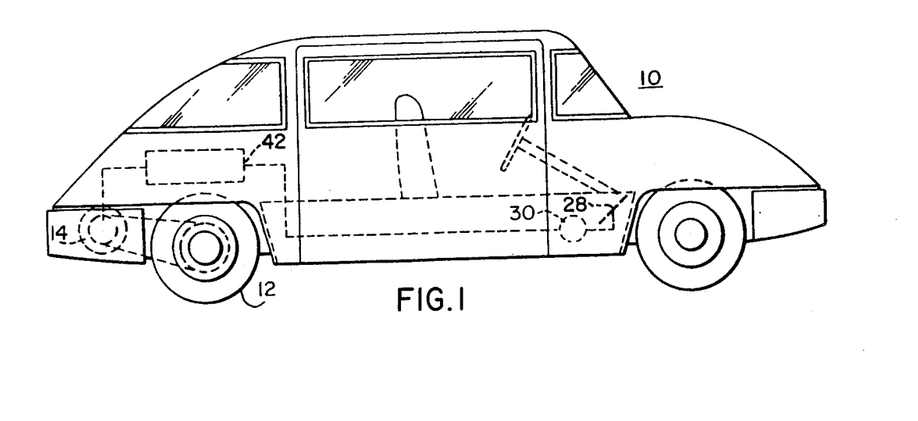
FIG. 1 shows an electric vehicle.

Referring now to the drawings, there is shown an electric vehicle 10 having a controlled system utilizing the teaching of the present invention.

Electric vehicle 10 has drive wheels 12 driven through a drive system by a direct current drive motor 14. The direct current drive motor 14 is of the type of having shunt field winding 18 which can be separately excited for speed and torque control. A torque converter can be utilized to control the speed of the electric vehicle 10 when operating at less than a predetermined base speed as described more fully in U.S. patent application Ser. No. 346,199. A direct current power supply, which is normally a battery pack 16, supplies operating power. Separately excited field winding 18, of the direct current drive motor 14, is supplied with excitation current from controller 42. The excitation current supplied to the field winding controls the torque speed characteristics and the regenerative braking of the separately excited direct current drive motor 14.

Electric vehicle 10 is provided with a variety of safety features, some of which are: (1) depressing the brake pedal results in regenerative braking even when the throttle is depressed; (2) if the motor speed exceeds a predetermined value, full-field current is demanded and any throttle signal is cancelled, and if regenerative braking does not result in a short time period, the power supply 16 is disconnected from the drive motor 14; (3) if armature current exceeds a maximum value, full-field current is demanded, and if the armature current does not fall below this maximum value in a short period of time, the motor 14 is disconnected from the power source 16; (4) a predetermined field current is required before voltage can be applied to the armature of DC drive motor 14; (5) a minimum field current is applied at all times during operation of the electric vehicle 10; (6) when the setting of the throttle is less than some minimum value an increased value of field current is applied to the direct current drive motor 14 resulting in regenerative armature current flow; and, (7) if the drive motor overheats armature current fed to the motor for any given throttle setting is reduced until the drive motor 14 is cooled off.

Figure 2:
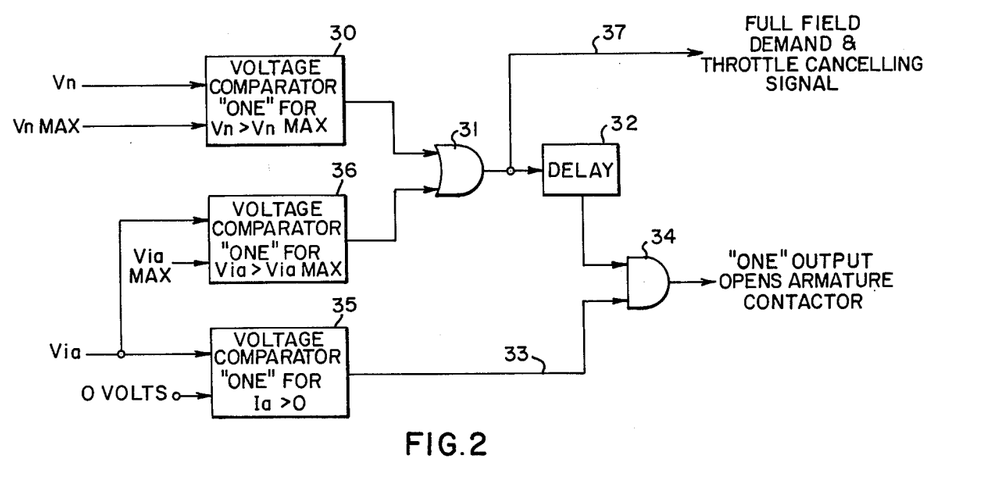
FIG. 2 is a schematic showing an electrical circuit for providing motor speed and armature current protection.

Referring now to FIG. 2 there is shown a block diagram of an electric control for motor speed and armature current protection. An output voltage (Vn) proportional to motor speed is provided. If the speed of a drive motor 14 exceeds a maximum value, the voltage Vn proportional to motor speed is greater than the reference Vn max then voltage comparator 30 of FIG. 2 provides an output signal which is applied through the OR gate 31 to a field control circuit, along line 37, to demand full-field current and cancel any throttle demand signal. With drive motor 14 running at high speed applying full-field current should cause a large regenerative armature current which removes energy from vehicle 10 to charge the battery 16. This large regenerative armature current should decelerate the vehicle 10. As the vehicle 10 decelerates the motor 14 speed will fall and the voltage Vn proportional to motor speed will become less than the voltage Vn max corresponding to the maximum permissible motor speed and normal operating conditions will be restored. If the vehicle 10 is descending such a steep grade that the overspeed signal persists the large regenerative current will be maintained as this is the maximum regenerative braking force that can be obtained. The armature contactors connecting the power supply 16 to the DC drive motor 14 will not be opened under these conditions. A delay 32 is provided for the signal from OR gate 31 to allow time for the armature current to assume a regenerative (negative) polarity. The armature contactors will not be tripped even though a one signal is obtained from the time delay 32 as long as the armature current is negative indicating regenerative braking. Negative armature current results in voltage Via being negative since voltage Via is proportional to armature current. This negative voltage results in a ZERO output signal 33 from voltage comparator 35 which inhibits AND gate 34. Input 33 to AND gate 34, when ONE indicates that armature current is greater than zero, thus there is no regenerative braking present. This can be caused when the drive system is defective, and the overspeed continues because the motor is applying output power. Under these circumstances, armature current will be positive supplying a ONE signal from voltage comparator 35. ONE outputs from both the time delay 32 and voltage comparator 35 activate AND gate 34 which supplies a signal to disconnect the armature of the direct current drive motor 14 from the power supply 16. Voltage comparator 35 compares a voltage proportional to armature current Via with a zero voltage reference. Voltage comparator 35 provides a ONE output signal for armature current greater than zero.

Voltage comparator 36 is provided for comparing the voltage signal Via, which is proportional to armature current, to a preselected voltage signal Via max, representing the maximum allowable armature current. If Via exceeds Via max voltage comparator 36 provides an output signal to OR gate 31. The ONE signal from voltage comparator 36 acts through OR gate 31 to demand full-field current and a throttle cancelling signal from the field controller. The output of OR gate 31 is fed along line 37 to the field controller. Applying full-field current should cause the armature current to be reduced below the maximum permissible armature current Ia max and the output of the comparator 36 should return to zero and reset time delay 32. If the drive system is defective and the armature current remains greater than Ia max continuously for a time longer than the delay, then the AND gate 34 will be enabled and supply a signal to open the armature contactors. When AND gate 34 is activated, the armature contactors are tripped disconnecting the drive motor 14. Note that in this case, voltage comparator 35 will always be producing a ONE output since armature current is greater then zero.

Figure 3:
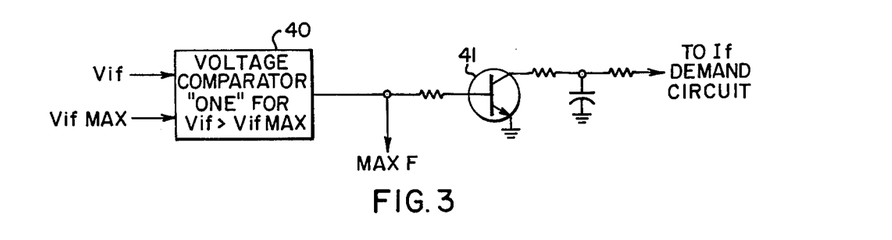
FIG. 3 shows the circuit for providing maximum field current protection.

Referring now to FIG. 3, there is shown a circuit for regulating maximum field current. A signal Vif which is voltage proportional to field current is fed to comparator 40 and is compared with a voltage Vif max, a signal voltage proportional to the maximum allowable field current. When the field current reaches its full value (100% If) then comparator 40 produces a ONE output which is normally used in the reconnect logic shown in FIG. 7. This ONE signal can also make transistor 41 conduct and draw a current from the field demand circuit to reduce the field current supplied. This circuit tends to regulate field current at a maximum value as long as the field controller demands a field current which exceeds maximum allowable field current If max.

Figure 5:
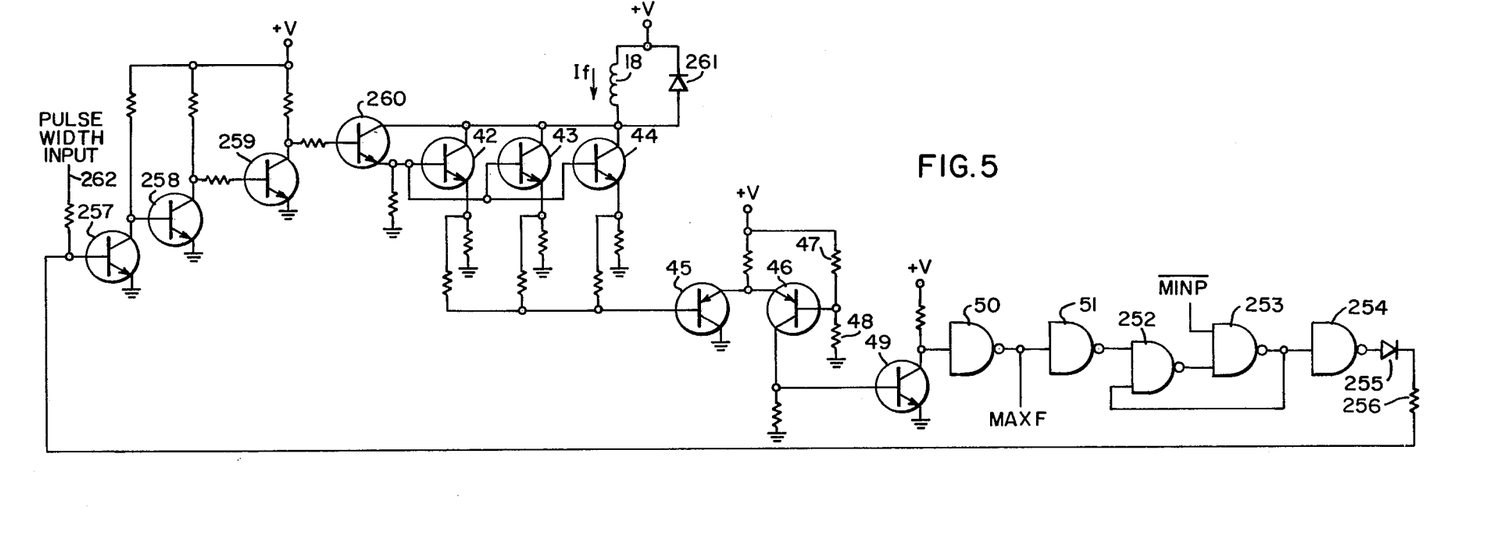
FIG. 5 shows the schematic and electric circuit for providing for control of the field current.

Referring now to FIG. 5 there is shown a different embodiment of a circuit for regulating maximum field current. Transistors 42, 43 and 44 act as a pulse width modulator and conduct for at least a minimal pulse time per cycle. When a current pulse flows through transistors 42, 43 and 44, this pulse being of the same magnitude as current flowing through the field winding 18, a signal Vif proportional to field current is applied to transistor 45. The base of transistor 46 is supplied a voltage, from the voltage divider comprising resistors 47 and 48, which is proportional to the maximum desired field current If max. If the field current is greater than the maximum desired field current, transistor 46 will conduct which in turn causes transistor 49 to conduct, as long as field current remains above the desired value. The output of gate 50 designated as signal MAXF will be a ONE during this period. Signal MAXF will remain a ONE while the value of the pulse current is greater than the desired full-field current. While signal MAXF has a value of ONE, this causes gate 51 to produce a ZERO output which sets the flip-flop comprised of gates 252 and 253 so that gate 253 provides a ZERO output. The ZERO output of gate 253 produces a ONE output from gate 254 which caused diode 255 to conduct and supply a positive current through resistor 256 which causes transistor 257 to conduct thereby overriding the normal pulse width input 262. When transistor 257 conducts it causes transistor 258 to block which in turn causes transistor 259 to conduct. When transistor 259 conducts transistors 260, 42, 43 and 44 block. The field current then circulates through the free wheeling diode 261 and the field current decays toward a lower value. Even after transistors 42, 43 and 44 block and therefore the MAXF pulse signal becomes a ZERO, the flip-flop comprised of gates 252 and 253 remains in the set state with a ZERO output from gate 253. This output keeps transistors 42, 43 and 44 in the blocking condition. The flip-flop comprised of gates 252 and 253 is reset during a small portion of each cycle of the pulse width modulator by the signal $\overline{\text{MINP}}$ which has a ZERO value during this small portion of the cycle. When the flip-flop is reset the output of gate 253 becomes a ONE and the output of gate 254 becomes a ZERO which causes diode 255 to block. This restores control of the pulse width input signal 262. The pulse width input signal is designed to have ZERO value that demands conduction of the output transistors 42, 43 and 44 during the short time that $\overline{\text{MINP}}$ has a ZERO value. This corresponds to the minimum pulse width conduction of the output which ensures a minimum value of field current. This minimum pulse occupies only about one eighth of the period of the pulse width modulator. If the field current is still above the maximum allowable value at the end of this minimum pulse, the ONE value of the MAXF signal from gate 50 will cause a ZERO from gate 51 to set the flip-flop and cause output transistors 42, 43 and 44 to again block for the remaining seven-eighths of the period of the pulse width modulator. Continuous control of the field current pulse width modulator will be returned to pulse width input control signal 262 only when the field current has fallen below the maximum desired field current. When signal 262 demands a field current greater than the allowable full-field value the action of the comparator consisting of transistors 45 and 46 in conjunction with flip-flop 252–253 is to reduce the effective field current demand signal and keeps the field current approximately equal to the maximum desired field current.

Figure 4:
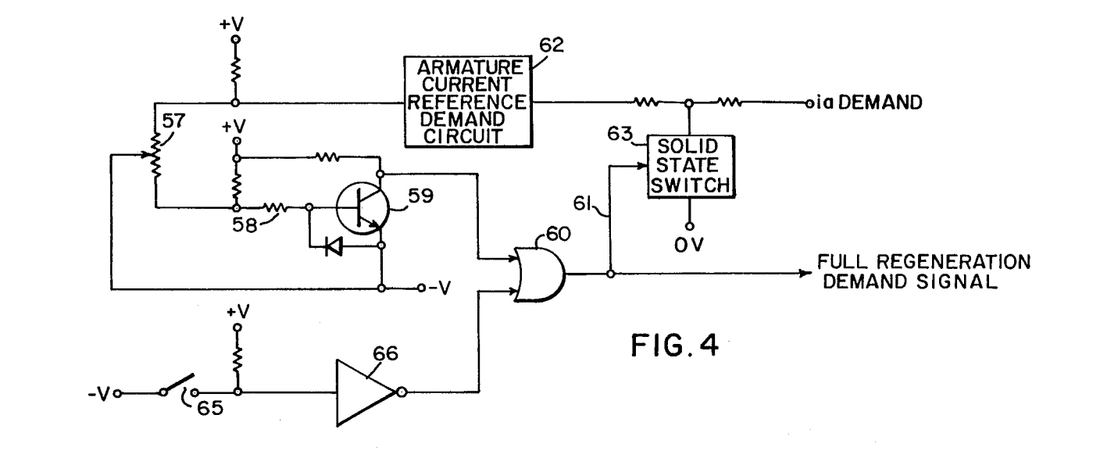
FIG. 4 shows the circuit for providing brake and throttle control.

Referring now to FIG. 4, there is shown a circuit providing brake override and minimum throttle setting override signals. When the setting of the throttle potentiometer 57 which is coupled to a throttle pedal (not shown) is less than a selected value, for example, 5% of the setting, resistance between the wiper and the lower end of the potentiometer 57 will be low enough to shunt resistor 58 to minus causing transistor 59 to block, providing a ONE output signal. This ONE output from transistor 59, when the throttle potentiometer 57 is set below a minimum value, passes through OR gate 60 and calls for full regenerative armature current and also provides a signal along connection 61 which turns on a solid state switch 63 to shunt any throttle demand signals to zero. The armature current reference demand circuit 62 provides an output signal Ia demand which represents the armature current demanded by the throttle setting. When solid state switch 63 conducts, this signal is shunted to ground and no armature current is demanded. Therefore, if there is a failure in the reference demand circuit or in the throttle potentiometer circuit, any undesired high armature current demand signal is cancelled when the throttle pedal is released. In addition, the throttle potentiometer circuit tends to be failsafe. That is, throttle signal is negative for the full throttle and if the wiper opens or the potentiometer 57 resistance opens the throttle signal becomes positive and demands regeneration. In an alternate embodiment a switch can be used to indicate the release of the throttle pedal and result in a ONE signal being applied to OR gate 60.

If the brakes are applied, brake switch 65 is closed which produces a zero output. This is inverted to a ONE signal by inverter 66 and this ONE signal passes through OR gate 60 and calls for full regenerative armature current and cancels any throttle demand signal by energizing the solid state switch 63. Switch 63 then shunts the throttle demand signals to zero. Therefore, if the throttle is stuck wide open, the operator will instinctively apply the brake which cancels the throttle signal and demands full regenerative braking by the direct current drive motor 14. As explained in more detail below a minimum field current independent of the field current demand signal is provided by applying a minimum pulse width override signal to a pulse width modulator circuit. Applying a minimum pulse width signal has several advantages over simply applying a minimum field current. When the battery voltage is low, the field current resulting from the fixed minimum pulse width is reduced and therefore the minimum back EMF is reduced. Reducing the minimum pulse width as the battery discharges permits obtaining a reasonable maximum speed at low charge levels. For the opposite case, down-hill regeneration with a fully charged battery, the fixed minimal pulse width provides a higher field current which provides regenerative braking from the motor even if the driver depresses accelerator to see how fast the vehicle will go. For a battery having a low charge, a maximum drive motor speed of 3,690 rpm using a fixed pulse with control or a fixed field current signal can be obtained. For a fully charged battery using a fixed pulse switch signal, the maximum motor speed is approximately 3,850 rpm while the corresponding motor speed for a fixed field current is 4,880 rpm. Since the motor may be damaged at speeds above 4,400 rpm, a fixed minimum field current is not satisfactory. The fixed minimum pulse width can be seen to provide good control of maximum motor speed without unnecessarily reducing the maximum speed under normal and low battery conditions.

A temperature sensor can also be provided for protecting the motor 18 against excessive overheating. When the temperature of the motor exceeds a predetermined value, temperature sensor is activated and permits motor 14 operation at reduced performance until the motor temperature drops below the overheated value.

Figure 6:
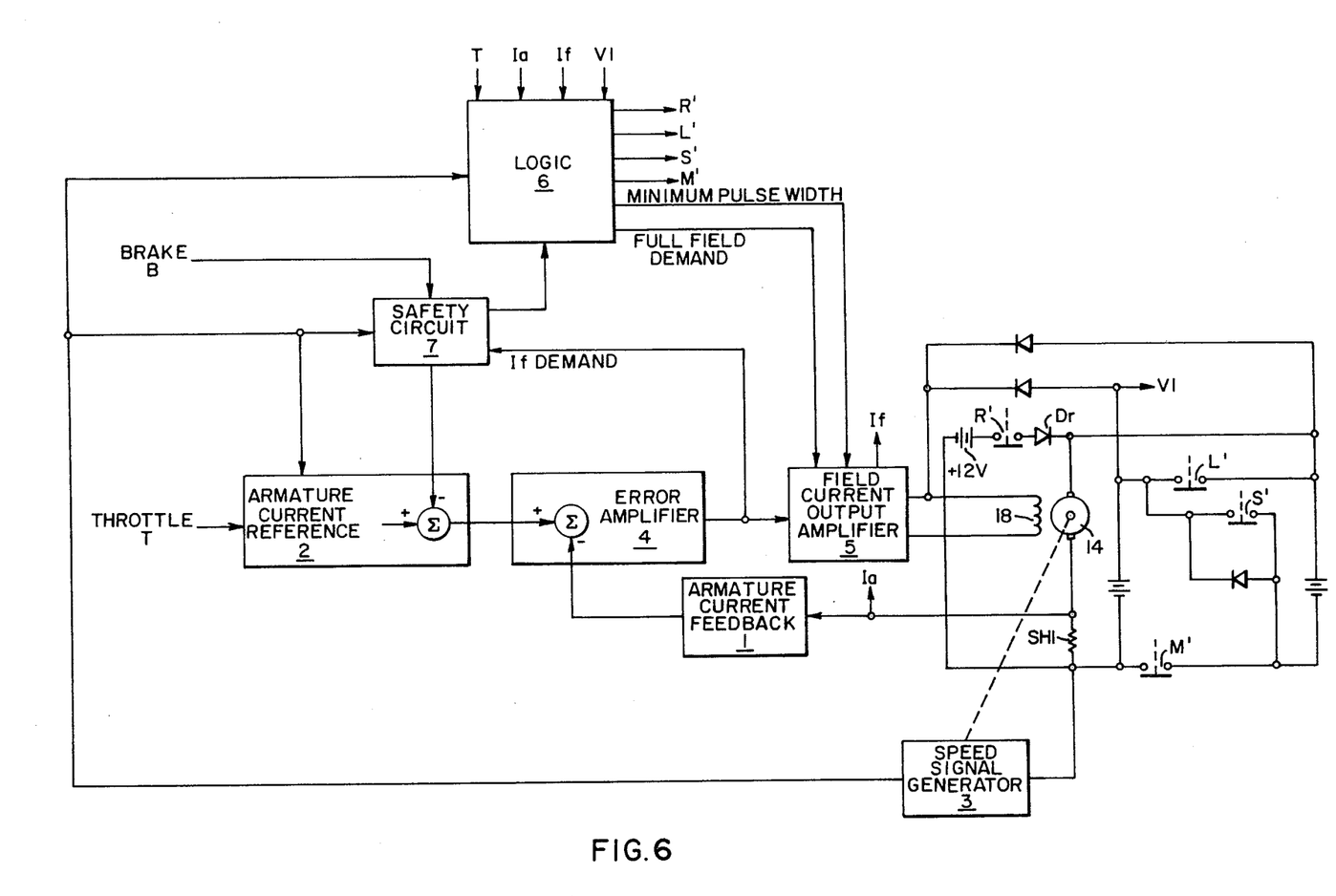
FIG. 6 shows a block diagram of an electric circuit for controlling operation of an electric vehicle; and, FIGS. 7A, 7B and 7C show a detailed circuit of the block diagram of FIG. 6 utilizing the teaching of the present invention.
Figure 7A:
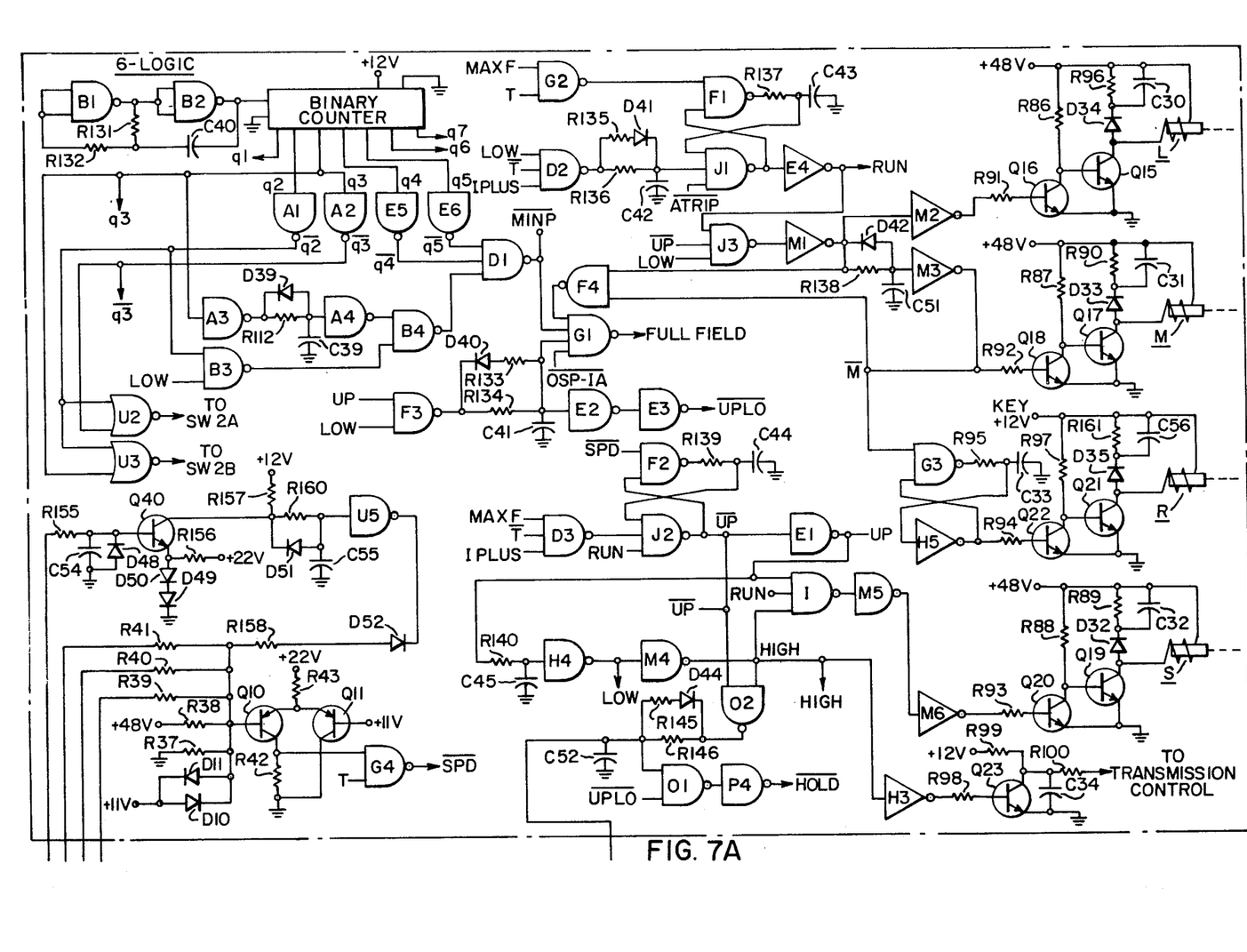
Figure 7B:
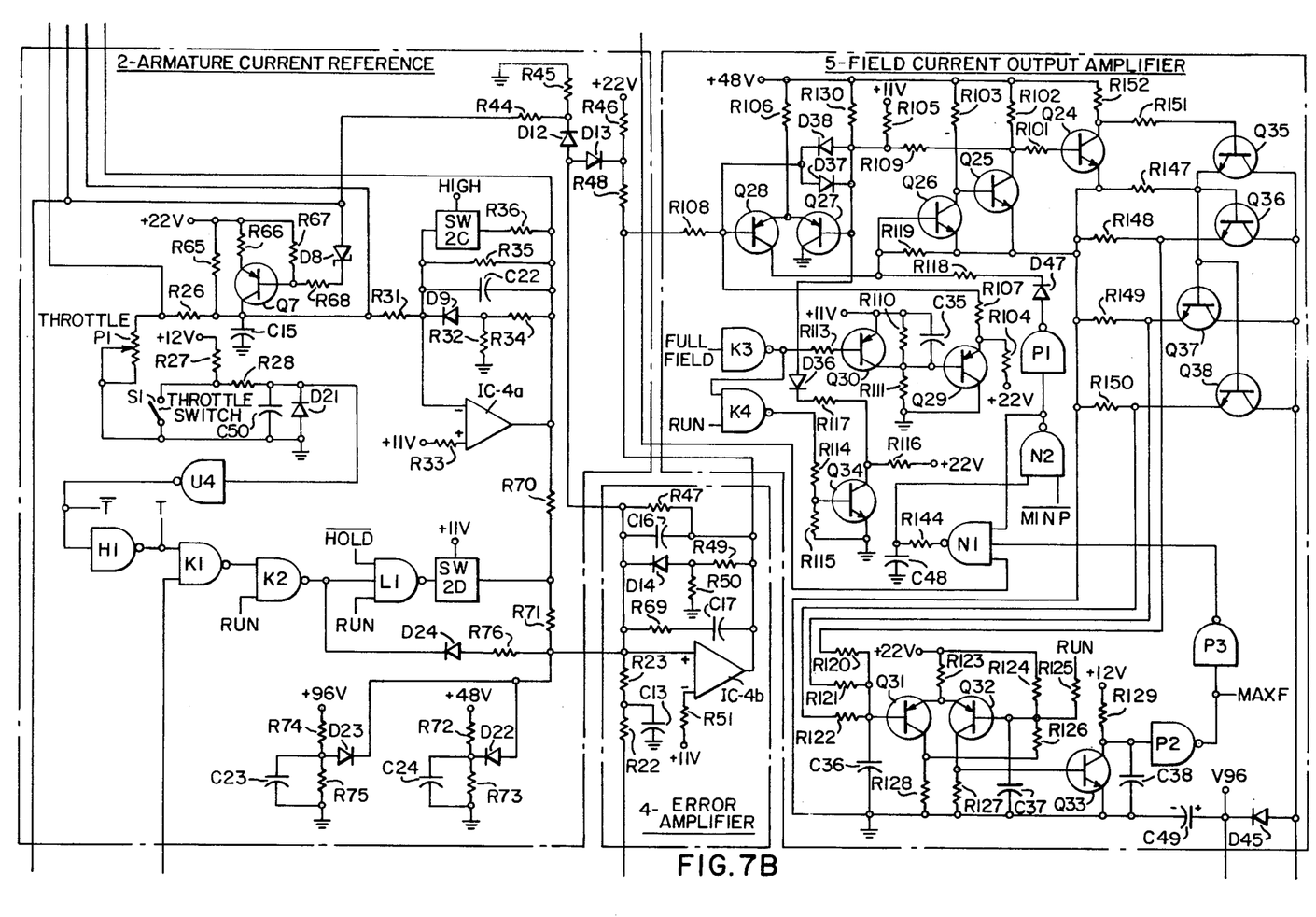
Figure 7C:
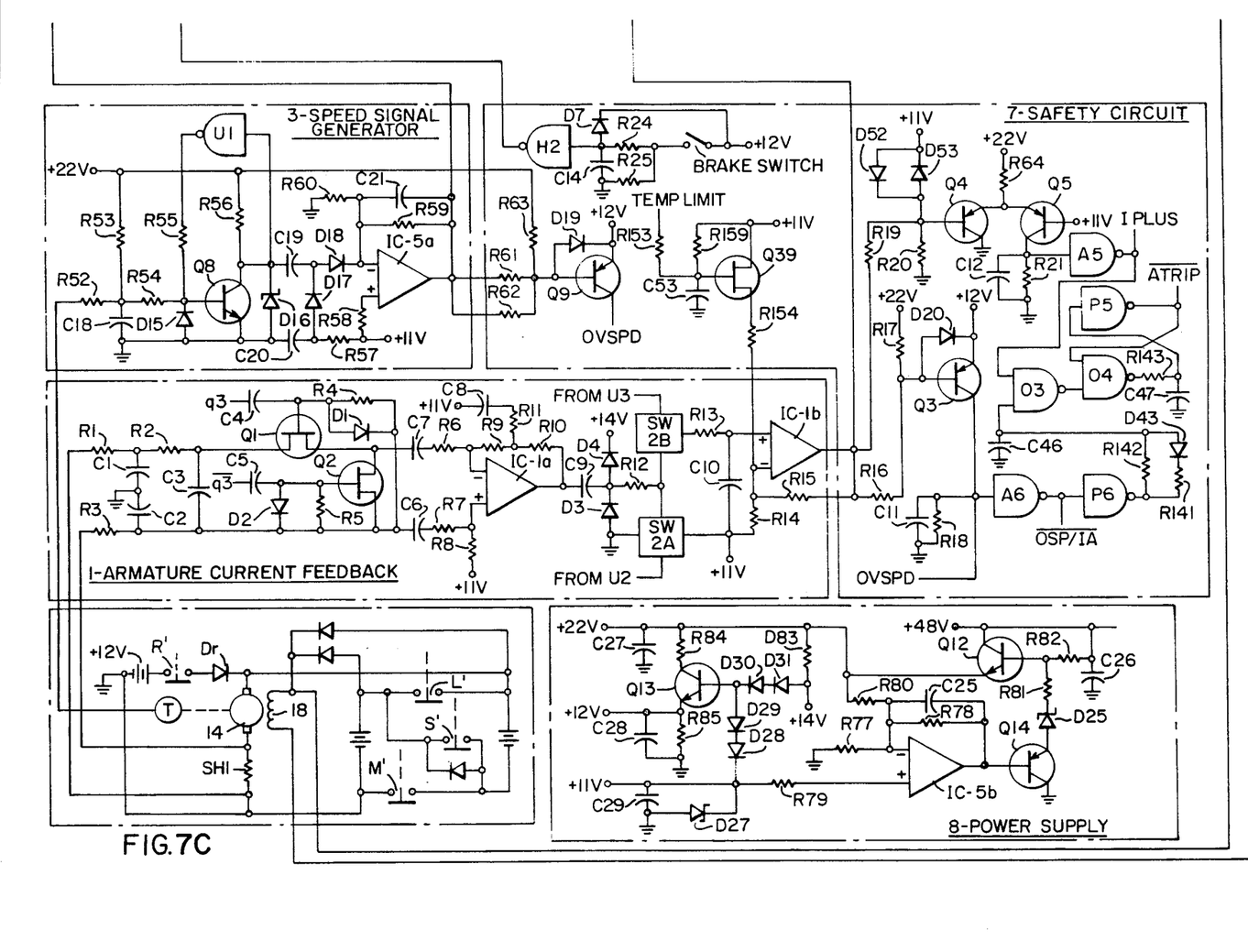

Referring now to FIGS. 6 and 7, there is shown a feedback field control circuit 100 for an electric vehicle utilizing the teaching of the present invention. This control circuit 100 will now be described in detail.

The feedback field control circuitry can be divided into a number of functional areas:

(1) Armature Current Feedback 1 — provides an output feedback signal proportional to armature current. A shunt SH1 provides a signal having a value of 0.1 mv per ampere of armature current. The armature current feedback 1, provides a signal which is inversely proportional to armature current (Ia) having for instance a value of 7V for Ia = +400A, 11V for Ia = 0, and 15V for Ia = −400A.

(2) Armature Current Reference 2 — provides an armature current reference signal which represents the desired value of motor armature current. The output voltage signal of the armature current reference is a function of throttle setting, throttle switch S1, and motor speed. The output signal of the armature current reference 2 is also influenced by various operating conditions such as: (1) for the high voltage connection regenerative voltages above 130V tend to reduce the regenerative current demand signal; (2) for the low voltage connection where a high current drain pulls battery voltage below 30V the demand signal is reduced; (3) for higher motor speeds, above 3000 rpm, which may cause commutator sparking and damage, the demand signal is reduced; and, (4) for low field current values the demand signal is reduced.

(3) Speed Signal Generator 3 — produces a signal having a frequency proportional to motor speed, where energy per pulse is constant so current varies as speed. This signal is modified to provide an output voltage inversely related to motor speed. For example, the output signal = 17V at zero speed and decreases 3 volts for each 1000 rpm increase in speed.

(4) Error Amplifier 4 — compares the armature current reference signal with the armature current feedback signal and provides a voltage signal which is proportional to the desired value of field current.

(5) Field Current Output Amplifier 5 — amplifies the voltage signal from the error amplifier 4 and provides field current to the drive motor 14. The field current output amplifier 5 uses pulse width modulation with some minimum pulse width provided for supplying a minimum value of field current to the drive motor 14. The field current output amplifier is coupled to the 48V battery supply to keep field output current constant as battery voltage decreases. Before starting and when idling maximum field current is regulated at 8 amps.

(6) Logic 6 — determines when to switch battery connections. On starting, contactor L is first energized then after a slight time delay M is energized. Logic 6 initiates switching battery connections at the optimum time.

(7) Safety Circuits — provide safety features some of which are: (1) depressing the brake pedal results in regenerative braking even with the throttle wide open; (2) if motor speed exceeds 3700 rpm, full-field current is demanded and the throttle signal is cancelled; (3) if armature current exceeds 500 amps full-field current is demanded; (4) a field current of at least 8 amps must be present before voltage can be applied to the armature; and, (5) if the drive motor overheats the armature current feedback signal is increased and actual armature current will be reduced permitting operation at reduced performance.

(8) Power Supply — provides regulated +11V, +12V, +14V, and +22V output supplies even though the input voltage varies over a wide range.

The functional areas listed above will now be described in more detail.

(1) ARMATURE CURRENT FEEDBACK

The armature current of the motor flows through a 0.1 milliohm shunt SH1. The signal from the shunt SH1 is brought to the control by means of a twisted shielded pair of wires to terminals connected to resistors R1 and R3. Resistors R1 and R3, in conjunction with capacitors C1 and C2, form a low pass filter which minimizes the introduction of spurious electrical noise signals into the control. The second section of filtering is provided by resistor R2 and capacitor C3. The signal from the shunt can have either a positive or negative polarity depending upon whether the motor is being operated in the motoring or regenerative mode. The shunt SH1 provides a 40 millivolt signal for an armature current of 400 A. This signal, after filtering, appears across capacitor C3.

Field effect transistors Q1 and Q2 function as high frequency switches which alternately select a zero voltage and the voltage across C3 at a chopping rate of 8 kHz. This chopped voltage appears across field effect transistor Q2 and is coupled to an ac amplifier circuit by means of capacitors C7 and C6. The ac amplifier circuit consists of operational amplifier IC-1a, resistors R6, R7, R8, R9, R10, R11 and capacitor C8. This amplifier increases the amplitude of the square wave voltage appearing across transistor Q2 by a factor of approximately 32. The amplified signal from the output of the operational amplifier is coupled to a demodulating circuit by capacitor C9. The demodulating circuit consists of resistors R12 and R13, capacitor C10, and switches 2A and 2B. Diodes D3 and D4 are normally non-conductive and serve only to protect the demodulator from excessive transient voltage excursions.

Switches 2A and 2B alternately conduct to provide a sample-and-hold type circuit in conjunction with capacitor C10. For zero armature current, the output at the junction of capacitor C10 and resistor R13, remains at the reference signal level of 11 volts. For a positive value of armature current, the output signal at the junction of R13 and C10 is negative with respect to the 11 volt reference level. This signal is amplified by the voltage follower circuit consisting of operational amplifier IC-1b and resistors R14 and R15. The output of this operational amplifier is a voltage which is proportional to armature current and is called the armature current feedback signal. For zero armature current, this signal has the reference level of 11 volts. It has a value of 7 volts for a 400 ampere armature current, and a value of 15 volts for a −400 ampere armature current.

(2) ARMATURE CURRENT REFERENCE

The purpose of the armature current reference circuit is to generate a voltage which represents the desired value of motor armature current. This voltage is a function of the throttle position as indicated by the resistance of potentiometer P1, throttle switch S1 and motor speed. Potentiometer P1, in conjunction with resistors R26 and R65, form a voltage divider network which provides a voltage at the junction of resistors R26 and R65 which is a function of the throttle setting. The value of this voltage is also influenced by the collector current of transistor Q7 which provides a current that is dependent on motor speed. A voltage related to motor speed is applied to the base of transistor Q7 by means of Zener diode D8 and resistors R68 and R67. This base voltage becomes less positive as the motor speed increases and thereby provides a collector current which increases with increasing motor speed. The proportionality between this current and the base voltage is determined by the value of resistor R66. The collector current in conjunction with the voltage divider network and potentiometer P1, provides a voltage which is a function of both motor speed and throttle setting, and permits smooth control of the motor in both the motoring and regenerative braking modes. Capacitor C15 serves to filter out extraneous electrical noise signals.

The signal from the junction of resistors R26 and R65 is amplified by the amplifier stage consisting of operational amplifier IC-4A, resistors R31, R32, R33, R34, R35, R36, capacitor C22, diode D9, and switch 2C of integrated circuit IC-3. The gain of this amplifier depends on whether the motor is being operated in the high voltage battery connection or the low voltage battery connection. In the low voltage battery connection, switch 2C is open-circuited and the gain of the amplifier in the linear region is determined by the ratio of resistors R35 and R31. The maximum positive value of the amplifier output is limited by the network consisting of resistors R34 and R32 and diode D9 which conducts only for output voltages exceeding a given positive value with respect to the reference signal level of 11 volts. Capacitor C22 serves to reduce the gain for high frequency noise signals.

When the motor is operating in the high voltage battery connection, switch 2C conducts, thereby placing resistor R36 in parallel with resistor R35. This reduces the amplifier gain to approximately 46% of the gain obtained when operating in the low voltage battery connection. This change in gain serves to reduce the armature current reference demand for the same throttle setting when operating from the high voltage battery connection. This gain change makes it possible to approximately match the motor torques at low throttle settings independent of the low voltage or high voltage battery connection.

Throttle switch S1 is closed for throttle settings of less than 5%. With switch S1 closed, a ZERO signal is coupled to gate $U_4$ by means of low pass filter R28-C50. Diode D21 protects the gate from reverse voltage transients. With switch S1 closed, the output of gate $U_4$, which is labeled $\overline{T}$, has a logical value of ONE. This signal is coupled through NAND gate $H_1$ to provide output signal T, which has a value of ZERO when the throttle switch is closed. This signal is applied to NAND gate $K_1$ which in turn applies a ONE signal to the input of NAND gate $K_2$. This signal in conjunction with a RUN signal of value ONE, which indicates that the motor is running, provides a ZERO output from NAND gate $K_2$. This ZERO signal is connected to NAND gate $L_1$ which provides a ONE signal to switch 2D. This causes switch 2D to conduct and hold the voltage at the junction of resistors R70 and R71 at the reference value of 11 volts. The ZERO output of NAND gate $K_2$ causes diode D24 to conduct and provide a current through resistor R76. This current causes a current reference value which demands regeneration.

During regeneration, when operating in the high voltage connection, the armature voltage may increase to over 100 volts. If one of the connections to the battery becomes loose so as to produce a high resistance connection, the voltage could rise substantially higher. In order to protect the field control circuit from excessive voltage, the network consisting of resistors R74 and R75 and diode D23 reduces the value of the regenerative current demand if the armature voltage exceeds 130 volts.

The power supply of the field control operates from the 48-volt battery voltage. When the batteries are nearly discharged, and when drawing high values of armature current, this voltage may fall to less than 30 volts unless the value of the armature current is suitably limited. The network consisting of resistors R72, R73 and diode D22 acts to reduce the value of motoring armature current whenever this battery voltage falls below 30 volts. Under this condition diode D22 conducts and limits the armature current reference and thereby prevents the voltage to the control from becoming excessively low.

At higher speeds, it is necessary to reduce the armature current in order to avoid sparking at the commutator and also to avoid excessive heating of the motor while running the vehicle continuously at high speeds. A signal obtained from the speed signal generator described below is introduced through resistor R44 to the junction of resistor R45 and diode D12. As the motor speed increases the signal applied to R44 becomes increasingly negative which lowers the voltage at the junction of R44 and R45. At approximately 3000 rpm, diode D12 begins to conduct thereby reducing the current reference signal applied to operational amplifier IC-4b. The current conducted by diode D12 increases with a further increase in motor speed, thereby further reducing the armature current reference signal.

Difficulties with commutator sparking also tends to occur at low field current values. This signal output from operational amplifier IC-4b is proportional to field current and becomes less positive as the field current is reduced. This signal is applied through resistor R48 to the junction of resistor R46 and diode D13. As the field current is decreased, the voltage at the junction of R46 and R48 becomes less positive until diode D13 begins to conduct. The current flowing through diode D13 serves to reduce the value of armature current reference.

(3) SPEED SIGNAL GENERATOR

A magnetic pickup is magnetically coupled to a gear on the motor shaft which provides a frequency proportional to motor speed. The signal from this pickup which has a sinusoidal waveform is applied to resistor R52 of the speed signal generator. Resistor R53 serves to apply a bias current to input transistor Q8 by means of resistor R54. Capacitor C18 serves to attenuate any noise signals applied to the speed signal generator input. Diode D15 protects the transistor input from negative voltages. Transistor Q8 is biased so as to produce a square wave output at its collector. The collector signal is fed back to the input of the transistor by means of inverter gate $U_1$ and resistor R55. This signal provides hysteresis which helps to provide a good switching waveform from transistor Q8. The input signal applied to capacitor C19 varies between zero volts when transistor Q8 is conducting, and 11.7 volts as determined by reference Zener diode D16 when transistor Q8 is blocked. During the transition of this voltage toward zero volts, diode D17 conducts and places a charge across capacitor C19. When transistor Q8 blocks and the voltage applied to the capacitor rises toward 11.7 volts, diode D18 conducts and discharges the capacitor into the input of operational amplifier IC-5. The same amount of electrical charge is transferred through diode D18 into the operational amplifier input during each cycle of the square wave input. Therefore, the average current applied through diode D18 is proportional to the frequency of the input signal which is in turn proportional to motor speed. The proportionality between the output signal from operational amplifier IC-5 and speed is determined by the value of resistor R59. Resistor R60 provides a biasing input to the operational amplifier and thereby determines the voltage output for zero speed. Capacitor C21 serves to filter the ripple from the output signal and thereby provide a low ripple output voltage. Resistor R57 and capacitor C20 act as a low pass filter to provide an 11 volt bias to the anode of diode D17. Resistor R58 provides the 11 volt reference bias to the positive input of operational amplifier IC-5.

The output of operational amplifier IC-5 is a voltage linearly related to motor speed which has a value of approximately 17 volts at zero speed, and decrease linearly in voltage by 3 volts for each 1000 rpm increase in speed.

(4) ERROR AMPLIFIER

The error amplifier compares the armature current reference signal applied through resistors R70 and R71 as modified by the currents from diodes D12, D13, D22 and D23, with the armature current feedback signal applied through resistors R22 and R23. The difference in these signals represents an error signal which is amplified by operational amplifier IC-4B to provide a voltage signal which is proportional to the desired value of field current. In the steady state the gain of the operational amplifier is determined by resistor R47, while for more rapid variations the gain is determined by resistor R69 by means of the signal coupled through capacitor C17. Capacitor C16 acts to reduce the value of high frequency noise signals. The network consisting of resistors R49, R50 and diode D14 serves to limit the positive excursion of the operational amplifier output voltage. Bias is provided from the reference signal level of 11 volts to the positive input of the operational amplifier by means of resistor R51. The output of operational amplifier IC-4b normally lies between the limits of 6 volts and 16 volts with the more positive voltage calling for increased field current. This output voltage is applied to the field current output amplifier.

(5) FIELD CURRENT OUTPUT AMPLIFIER

The field current output amplifier amplifies the voltage signal from operational amplifier IC-4b and provides a field current output to the motor. Pulse width modulation is used to maintain high efficiency when operating from both 48 volts and 96 volts. A pulse width modulation frequency of 2 kHz is used as determined by the signal applied to gate $K_3$. Under normal operating conditions, this signal has a value of ONE for a small fraction of the cycle and a ZERO value for the remainder of the cycle. The ONE period corresponds to the minimum conduction time desired for the output stage, and thereby determines a minimum value of field current. During this ONE signal, the output of inverting gate $K_3$ is at zero volts which draws a current through resistor R113 that causes transistor Q30 to conduct. When transistor Q30 conducts, it discharges capacitor C35. When the input signal to gate $K_3$ is a ZERO, transistor Q30 is blocked and capacitor C35 is charged in the negative direction by resistors R110 and R111. This produces a negative exponential waveform across capacitor C35. This signal will be referred to as the saw-tooth modulation waveform for the pulse width amplifier. The impedance of this signal is lowered by the emitter follower consisting of transistor Q29 and resistor R104. This signal is coupled to the voltage comparator consisting of transistors Q27, Q28 and resistor R106 by means of resistor R107. The field demand signal from operational amplifier IC-4b is coupled to the voltage comparator through resistor R108. Diodes D37 and D38 serve to protect the base-emitter junctions of transistors Q27 and Q28 from excessive voltage. The current in transistor Q28 switches between an essentially fixed level and a value of zero depending on whether the voltage of the base of transistor Q28 is more negative or more positive than the voltage of the base of transistor Q27. Switching from one current state to the other occurs when the voltages at the bases of transistors Q27 and Q28 are approximately equal. Since the voltage at the base of transistor Q28 depends on the sum of the saw-tooth modulation waveform and the field demand signal, a change in the field demand signal will shift the point on the saw-tooth modulation waveform at which the current changes from one value to the other. Therefore, the voltage comparator acts as a pulse width modulator having a width of conduction dependent upon the field demand signal. The pulse width signal from the collector of transistor Q28 is applied to the base of transistor Q26 and causes transistor Q26 to switch between the conducting and blocked states. The output of transistor Q26 is amplified and inverted by transistor Q25, and the output of transistor Q25 is amplified and inverted by transistor Q24. A positive feedback signal from the collector of transistor Q25 is fed back to the base of transistor Q27 by means of resistor R109 for the purpose of providing hysteresis and more rapid switching. Resistor R105 serves to bias the base of transistor Q27 near 11 volts. Resistor R130 provides a coupling from the 48 volt battery supply to the base of transistor Q27 which tends to keep the field output current constant as the battery voltage decreases. This action is obtained by a shift in the comparator voltage which serves to increase the conducting pulse width as the battery voltage decreases.

In order to ensure that the comparator Q27–Q28 is in the proper state to cause output field current conduction during the minimum pulse width signal provided at the input of gate $K_3$, a negative current is applied to the base of transistor Q27 through diode D36 and resistor R117. This current flows when transistor Q34 is conducting. Transistor Q34 conducts whenever the output of NAND gate $K_4$ is in a ONE state. This ONE state occurs whenever the output of inverter $K_3$ is a ZERO which corresponds to the input signal to $K_3$ being a ONE. Transistor Q34 is also made to conduct when the signal RUN, which is applied to the input of gate $K_4$, is a ZERO. This occurs during motor idling conditions.

A ZERO signal is applied to gate $P_1$ whenever it is desired to cut off conduction of the output stage driving the field. This ZERO signal produces a ONE output from inverter $P_1$ which causes diode D47 to conduct. This current flows through resistor R118 and causes transistor Q26 to conduct which causes the output stage consisting or transistors Q35, Q36, Q37 and Q38 to block.

When transistor Q26 conducts, transistor Q25 blocks and transistor Q24 conducts. This causes the collector signal of transistor Q24 to be at approximately zero volts. This voltage is applied to the base of transistor Q35 through resistor R151 which causes transistor Q35 to block. With transistor Q35 blocked, resistor R147 holds the bases of transistors Q36, Q37, Q38 at zero volts which renders them in the blocking or non-conducting state.

The motor field is connected between the 96V terminal and the collectors of transistors Q35, Q36, Q37 and Q38. A free-wheeling diode D45 is connected across the field to provide a path for the field current to circulate during the time when transistors Q35, Q36, Q37 and Q38 are blocking. The field current will decrease in magnitude during the time that the current circulates through diode D45. To increase the field current, transistors Q35, Q36, Q37 and Q38 are made to conduct, thereby causing their collectors to assume a potential of approximately 2 volts. This places a large voltage across the field which causes the field current to increase. The field current may be made to assume any desired value by correctly proportioning the time during which output transistors Q35, Q36, Q37 and Q38 conduct. Normally, transistors Q35, Q36, Q37 and Q38 conduct during a portion of each cycle of the 2kHz modulating waveform.

During the time that transistors Q35, Q36, Q37 and Q38 conduct, their emitter currents flow through resistors R148, R149 and R150. The sum of these currents, neglecting the small current which flows through resistor R147, is equal to the value of the field current. The voltages across the resistors are averaged by resistors R120, R121 and R122 to provide a voltage proportional to the field current. This voltage is applied to the base of transistor Q31 and is compared in magnitude to the voltage at the base of Q32 which represents the maximum permissable value of field current. When the value of field current is excessive, transistor Q32 conducts and transistor Q31 blocks. The conduction of transistor Q32 causes transistor Q33 to conduct which provides a ZERO signal to the input of inverting gate $P_2$. This causes the output of gate $P_2$, which is called MAXF, to be a ONE. When MAXF is a ONE, it represents the condition of maximum permissible field current. This ONE signal is applied to the input of inverting gate $P_3$ which applies a ZERO input to an input $N_1$ of flip-flop $N_1$-$N_2$. This causes the output of gate $N_2$ to apply a ZERO value to the input of gate $P_1$ which results in cutting off the output stage Q35, Q36, Q37 and Q38. Therefore, when the output current exceeds the maximum desired value, it results in cutting off the output stage transistors Q35, Q36, Q37, Q38 which in turn reduces the field current. Flip-flop $N_1$-$N_2$ is reset during each cycle of the 2 kHz modulating signal by signal $\overline{\text{MINP}}$ applied to gate $N_2$. Signal $\overline{\text{MINP}}$ lasts for only a small fraction of the cycle corresponding to the minimum pulse width signal. The output transistors Q35–Q38 remain non-conducting during the remaining portion of the cycle until the field current fails below the maximum desired value.

The value at which the maximum field current is regulated depends upon the logical value of the signal RUN. Before the motor 14 has been started and during the time that the motor 14 is idling, RUN is equal to ZERO, which results in a zero voltage being applied to resistor R125. This signal biases transistor Q32 of the regulator and causes it to regulate the maximum field current at a level of 8 A. This serves to conserve battery power, reduce heating of the field winding 18 and to insure that this value of maximum field current can be obtained even under low battery conditions. This latter condition is necessary because the safety curcuits 7 require that the maximum field signal be present in order for the motor 14 to be started. Once the motor 14 is started, RUN becomes a ONE which applies a 12V signal to resistor R125 and results in the maximum value of field current being regulated at about 12A.

(6) LOGIC

Logic gates $B_1$, $B_2$, resistors R131 and R132, and capacitor C40 form a 64 kHz oscillator as described in the RCA COS/MOS Integrated Circuit Manual (Technical Series CMS-271). The output of this oscillator consists of a rectangular waveform that it connected to the input of binary counter C. The following square wave outputs are taken from the binary counter: $q2$ at 16 kHz, $q3$ at 8 kHz, $q4$ at 4 kHz and $q5$ at 2 kHz. The complements of these signals are provided by inverting gates $A_1$, $A_2$, $E_5$ and $E_6$ respectively.

The ZERO period of square wave $q3$ is shortened by the pulse shaping circuit consisting of logic gates $A_3$ and $A_4$, resistor R112, capacitor C39 and diode D39. When $q3$ becomes a ONE, diode D39 conducts and quickly discharges capacitor C39. Therefore, the ZERO-to-ONE transition at gate $A_4$ is delayed by only a short value of time. However, when $q3$ becomes a ZERO, the output of gate $A_3$ becomes a ONE and capacitor C39 is slowly charged positive through resistor R112. This causes the output from gate $A_4$, which corresponds to the ONE-to-ZERO transition of $q3$, to be delayed. The result is that the output from gate $A_4$ has a shorter ZERO period than square wave signal $q3$.

When in the high voltage battery connection, LOW = ZERO and logic gate $B_4$ simply inverts the signal from logic gate $A_4$. The output from gate $B_4$, the ONE period of which represents the minimum pulse width desired for the pulse width modulator conduction, is combined with the $\overline{q4}$ and $\overline{q5}$ signals in gate $D_1$ to provide a signal having a 2 kHz repetition rate and a ZERO period corresponding to the minimum pulse width. This signal is called $\overline{MINP}$. This signal is applied to gate $G_1$ and provides a ONE output from gate $G_1$ during the minimum pulse period. When in the low battery connection, LOW is a ONE which gates the $\overline{q2}$ signal through gate $B_3$ into gate $B_4$. This results in a 50% increase in the minimum pulse width.

The following description of the logic will be related to the sequence of events beginning with energizing the control, running at low speed, accelerating to high speed, returning to the low speed, running at idle speed, and finally shutting off the controller. When the car key switch 91 is turned on, 48 volts is applied to the controller power supply and the Key 12V voltage is connected to the Q21 output stage. The power supply provides the +22, +14, +12 and +11 voltages to the circuit. The +48V is also applied to the V96 terminal at the cathode of D45 of the field current output stage. At this point the motor is not running the signal RUN is in the ZERO state, which results in a zero voltage being applied to resistor R125 associated with voltage comparator Q31, Q32. This selects a maximum field current of approximately 8 amperes and, since the RUN signal applied to gate $K_4$ is a ZERO, the pulse width modulated field output amplifier demands this maximum field current of 8 amperes. The presence of this maximum regulated field current causes the signal MAXF to be a ONE.

When the throttle pedal is depressed, throttle switch S1 opens causing signal T to become a ONE. With both MAXF and T being equal to ONE at the input of gate $G_2$, gate $G_2$ produces a ZERO output which sets the flip-flop $F_1$-$J_1$ such that the signal RUN becomes a ONE. At this time the signal UP is a ZERO and the signal LOW is a ONE so that the signals applied to the input of gate $J_3$ are all in the ONE state, which provides a ZERO output from $J_3$ which is inverted to provide a ONE output from gate $M_1$. This signal is inverted by gate $M_2$ which provides a zero voltage output to resistor R91 which causes transistor Q16 to block and permits resistor R86 to energize transistor Q15 which conducts and energizes the coil of contactor L'. This closes the contacts of contactor L' which connects 48V to the armature of the motor thereby causing the motor to accelerate to approximately 960 rpm. The ONE signal from $M_1$, after a delay of several tenths of a second as determined by resistor R138 and capacitor C51, causes inverter $M_3$ to change state from a ONE to a ZERO which results in transistor Q17 conducting and energizing contactor M'. This places the second half of the battery string in parallel with the first battery string across the armature of the motor. This delay is provided so that the starting of the motor occurs at a somewhat higher impedance, thereby reducing the motor inrush current. During this delay of several tenths of a second, the signals from inverters $M_1$ and $M_3$, applied to gate $F_4$, are both in the ONE state. This produces a ZERO from the output of gate $F_4$ which is applied to an input of gate $G_1$ to demand full field current from the field current output amplifier. At the end of this delay when the output from inverter $M_3$ becomes a ZERO, this full current demand signal is removed and the field current depends upon the throttle setting. The ZERO output from gate $M_3$ also sets flip-flop $G_3$-$H_5$ which energizes the coil of relay R by means of transistors Q22 and Q21. Relay R connects a 12V battery to the armature through a diode whose cathode is at the armature voltage. Since the armature is connected to 48V at this time, this diode does not conduct. However, at a later time when the motor slows to several hundred rpm and the armature voltage falls below 12V, this diode will conduct and keep the motor idling at several hundred rpm. This flip-flop is reset when the power is removed from the controller.

If the throttle is further depressed, an increased value of armature current is demanded which results in an armature current error which in turn reduces the field current. This causes an increase in armature current and the motor accelerates to a higher speed. As the speed increases to a value in the range of 1500–1900 rpm, the speed signal generator output applied through resistor R41 becomes more negative. This signal is summed at the base of transistor Q10 along with a throttle voltage signal coupled through resistor R40, an armature current reference signal coupled through resistor R39, a battery voltage signal coupled through resistor R38, and a zero volt bias signal coupled through resistor R37. When the voltage at the base of Q10 falls below the 11V reference voltage applied to the base of Q11, transistor Q10 will conduct and its collector will provide a ONE input to gate $G_4$. The signal T is also a ONE, as long as the throttle remains depressed, and therefore the output of gate $G_4$ will be a ZERO. This output is called $\overline{SPD}$ and is applied to gate $F_2$ of flip-flop $F_2$-$J_2$. When $\overline{SPD}$ becomes a ZERO, it sets flip-flop $F_2$-$J_2$ and the output of gate $E_1$, which is driven by this flip-flop, becomes a ONE. This output is called UP and when it becomes ONE, it indicates that tthe control should begin the sequence required to reconnect from 48V to 96V.

When UP becomes a ONE, the $\overline{UP}$ signal applied to gate $J_3$ becomes a ZERO which results in de-energizing the L and M contactors. Diode D42 acts to discharge capacitor C51 rapidly and avoid an unnecessary delay for the signal coupled between the gates $M_1$ and $M_3$.

At this point in time, the UP and LOW signals applied to gate $F_3$ are both in the ONE state and therefore a ZERO output is obtained from gate $F_3$. Capacitor C41 is discharged after a short delay through the parallel paths of resistors R133 and R134, since diode D40 conducts when the output of $F_3$ is at the zero volts. The output across capacitor C41 becomes ZERO and this signal is applied to gate $G_1$ and demands full field current. As the field current is increased with contactors L, M and S open, the motor acts as a generator and applies an increasing voltage to the field. This further increases the rate of rise of field current so that the full field current is reached within a few tenths of a second and the motor emf rises toward 96V.

Meanwhile, the delayed UP signal, which is delayed by resistor R140 and capacitor C45, rises to a ONE value. This signal is applied to inverter $H_4$ and produces an output signal LOW = ZERO. This signal is inverted by inverter $M_4$ to produce signal HIGH = ONE. The combination of UP, RUN and HIGH all having a value of ONE applied to gate I produces a ZERO output which is coupled through gates $M_5$ and $M_6$ and transistor Q20 to turn on transistor Q19 and energize the S contactor. This contactor connects the two battery strings in series to provide 96V to the motor armature and to the 96V connection to the cathode of diode D45 of the field current amplifier.

When the signal LOW becomes ZERO, the output of gate $F_3$ returns to a ONE condition. This signal is delayed by resistor R134 and capacitor C41 for about a tenth of a second to allow time for contactor S to close before applying a ONE signal to gate $G_1$ and thereby removing the full field current demand. During the time that the full field demand signal is applied, the output from capacitor C41 is coupled by means of gates $E_2$ and $E_3$, $O_1$, $P_4$, and $L_1$ to switch 2D of IC-3. This switch 2D provides a ZERO armature current reference demand signal at the junction of resistors R70 and R71 which matches the near ZERO armature current which results from contactors L, M and S all being open. This prevents a large error signal from building up at the output of operational amplifier IC-4b which could cause an undesirable transient upon removal of the full field current demand signal.

With HIGH = ONE, the motor is run with 96V applied to the armature. As the throttle is depressed, the motor speed will increase toward its full speed value of 3300 to 3600 rpm.

When slowdown of the vehicle is desired, the operator will reduce the throttle setting. This will reduce the current demand reference toward zero amperes and may even result in a negative current (regenerative current) demand. If a throttle setting of less than about 5% occurs, throttle switch S1 will close and $\overline{T}$ will become a ONE. As the motor slows down, the value of the field current will be increased in order to maintain the desired value of field current at lower motor speed. When the field current reaches its maximum regulated value, MAXF will become a ONE. As the motor slows further, the magnitude of the negative armature current (regenerative current) will be reduced and output IPLUS of logic gate $A_5$ of the armature current comparator described below under "Safety" will become a ONE. This indicates that the amount of regenerative current has become negligible.

At this point the inputs to logic gate $D_3$, MAXF, $\overline{T}$ and IPLUS are all ONE's which provides a ZERO output from gate $D_3$ to reset flip-flop $F_2$–$J_2$ to the state corresponding to UP = ZERO. This indicates that the sequence to reconnect the batteries from 96V to 48V should be initiated. The UP = ZERO signal is applied through gates I, $M_5$, $M_6$, and transistors Q20 and Q19 to de-energize contactor S. With the signals $\overline{UP}$ and HIGH applied to gate $O_2$ both being ONE's, the output of gate $O_2$ becomes a ZERO and, after a delay determined by the parallel combination of resistors R145 and R146 and capacitor C52, sets flip-flop $N_1$–$N_2$ to a state that demands minimum field current. The motor emf, which is only applied to the motor field since contactors L, M and S are all open, falls toward a value near 48V as the field current is reduced.

The UP signal transition from a ONE to a ZERO is delayed for about a tenth of a second by resistor R140 and capacitor C45 in order to permit time for contactor S to open before beginning to energize contactors L and M. At the end of this delay, the output of capacitor C45 changes the output of gate $H_4$ to a ONE. This output signal called LOW then becomes a ONE and is applied through gate $M_4$ to make its output signal HIGH become a ZERO. Since the RUN, $\overline{UP}$ and LOW signals are all ONE at this time, they act through gates $J_3$, $M_1$, $M_2$ and $M_3$ and transistors Q16, Q15, Q18 and Q17 to energize contactors L' and M' which connect the 48V battery strings in parallel to the armature of the motor.

The transition of HIGH to a ZERO causes the output of gate $O_2$ to become a ONE. This signal is delayed by resistor R146 and capacitor C52 for about a tenth of a second to permit contactor S to pull in before removing the minimum field signal. During the transition period from 96V to 48V, the signal from capacitor C52 is coupled through gates $O_1$, $P_4$ and $L_1$ to switch 2D. This provides a ZERO reference current signal as previously described to prevent the build-up of an excessive error signal at the output of operational amplifier IC-4b.

If the throttle remains at a low setting, a regenerative current will again flow and result in further slowing of the vehicle and motor. The field current which had a low value at the time that contactors L' and M' pulled in, following the reconnection from 96V to 48V, is now increased to provide the desired armature current as the motor slows. Once the maximum value of field current is reached, the value of regenerative current will diminish and IPLUS will finally become a ONE, indicating negligible regenerating current. Assuming that a zero throttle setting still exists, the signals LOW, $\overline{T}$ and IPLUS applied to gate $D_2$ will all be ONE's and provide a ZERO output from gate $D_2$. This ZERO output will discharge capacitor C42 through resistor R136 and result in a ZERO signal being applied to gate $J_1$ to reset the $F_1$–$J_1$ flip-flop. This produces a RUN = ZERO output which opens contactors L and M. With the armature disconnected from both the 48V and 96V battery connections, the motor will slow down until its back emf falls below 12V, at which time the 12V battery will provide current through relay contacts R and the series diode to the motor armature. This will keep the motor running at an idle speed of about 200 rpm which maintains pump pressure in the automatic transmission and provide for smoother vehicle restarting without dissipating excessive power in either the motor or the automatic transmission. Idling at 200 rpm requires only about 100 watts as opposite to 500 or more watts at 960 rpm. When the key is turned off, relay R will open and all voltages will be removed from the controller. The motor will then stop and all capacitors in the control will discharge. When the key is turned on again, all of the flip-flops in the control will come on in the reset state because of the R-C networks applied in one side of the flip-flop cross coupling. These R-C networks also increase the time necessary to set the flip-flops and thereby provide increased immunity to noise. R137 and C43 are a typical example of the R-C network for flip-flop $F_1$–$J_1$. Similar networks are used for flip-flops $F_2$–$J_2$, $O_4$–$P_5$ and $N_1$–$N_2$.

To reduce battery drain and field dissipation the field current regulator level is reduced from 12A to 8A when RUN = ZERO. This is accomplished by means of resistor R125. This also ensures that the MAXF signal will be present during idling and before motor start-up when the field operates from voltages in the 48-volt range. Under low voltage conditions it may only be possible to reach 11A field current. Reducing the regulated level to 8A ensures that MAXF is a ONE since this is what regulates the field current. MAXF = ONE is needed for setting RUN = ONE.

Switch 2A of IC-3 is made conductive during the latter portion of one-half of the 8 kHz chopping period. This signal is derived in NOR gate $U_2$ using input signals $\overline{q2}$ and $\overline{q3}$. Similarly, switch 2B is made conductive during the latter portion of the other half of the 8 kHz period by means of signals $\overline{q2}$ and $q3$ applied to NOR gate $U_3$.

a 12V signal is provided to control the automatic transmission by means of transistor Q23 and resistors R99 and R100. This transistor is made to block when HIGH = ONE as controlled by the signal from gate $H_3$ and resistor R98. Capacitor C34 across the transistor protects the transistor from noise impulses.

There are unusual conditions that will prevent reconnection from 48V to 96V. One such condition is getting a wheel of the vehicle stuck in a severe road depression. Under these conditions, the motor speed will remain below the value needed to call for reconnection to 96V. Another possible condition would be a severe grade with a discharged battery. Under these contitions the additional power available in the 96V connection is required even though the reconnection cannot be achieved in a fully smooth manner. The circuit consisting of resistors R155 and R156, capacitor C54, diodes D48, D49 and D50, and transistor Q40 serves to sense when the throttle is fully depressed. Under these conditions the input to resistor R155 approaches ground potential and transistor Q40 will be blocked. Under this condition resistor R157 applies a positive potential to the long time constant filter consisting of resistor R160 and capacitor C55. After a time of approximately 2½ seconds, this filter will apply a ONE signal to gate $U_5$. The output of gate $U_5$ becomes a ZERO which causes diode D52 to conduct and draw current through resistor R158. This current reduces the motor speed at which the reconnection from 48V and 96V occurs by about 600 rpm, and therefore insures that the reconnection will occur. Under normal operating conditions with the throttle fully depressed, the motor speed will increase to a value sufficient to cause reconnection from 48V to 96V in approximately one second. Therefore, the time delay of resistor R157 and capacitor C55 will prevent any response from gate $U_2$ and diode D52 will remain in its normally non-conducting state.

(7) SAFETY CIRCUITS

A number of safety circuits 7 are provided to protect the controller and the vehicle in case of malfunctions or human error. When the brake is applied, the brake switch connects a 12V signal through a filter consisting of resistor R24, capacitor C14 and diode D7 to gate $H_2$. The resulting ZERO output from gate $H_2$ acts through gates $K_1$, $K_2$ and $L_1$ to make switch 2D conduct and cancel any input signal provided from the throttle potentiometer. At the same time, the ZERO output from gate $K_2$ causes diode D24 to conduct which provides a regenerative braking command. Therefore, depressing the brake results in a regenerative braking action from the motor even if the throttle was stuck in a fully depressed position.

The output of the speed signal generator from operational amplifier IC-5a is applied by means of resistors R61, R62 and R63 to an overspeed detection transistor Q9 which conducts if the motor speed exceeds 3700 rpm. Conduction of this transistor causes a ONE signal to be applied at the input of gate $A_6$. This signal is inverted by gate $A_6$ and applied to gate $G_1$ to demand full field current from the field current output amplifier. The increased field current when operating at this high motor speed will cause regeneative braking which should slow the vehicle. As soon as the motor speed is reduced below 3700 rpm, the full-field demand signal will be automatically removed. If there is a malfunction in the control circuit and the full field speed is not successful in reducing the motor speed, then emergency action is necessary. In that case the signal from $A_6$, which is coupled through gate $P_6$ to the delay circuit consisting of resistors R141, R142, diode D43, capacitor C46, is utilized. In this case the output signal from $P_6$ is a ONE and it is delayed for several tenths of a second by resistor R142 and capacitor C46. If after this delay time the armature current has not achieved a substantial regenerative value, the IPLUS signal applied to gate $O_3$ will be a ONE along with the delayed ONE signal from capacitor C46. This will result in a ZERO output from gate $O_3$ which will set the trip flip-flop consisting of gates $O_4$ and $P_5$ such that $\overline{ATRIP}$ becomes a ZERO. This signal is applied to gate $J_1$ of flip-flop $F_1$-$J_1$ and resets RUN to a ZERO. This causes all of the armature circuit contactors to open and remain open.

The voltage output of operational amplifier IC-1b, which represents the armature current, is applied to overcurrent detecting transistor Q3 by means of resistor R16. Resistor R17 serves to bias the switching point of transistor Q3 at an appropriate value. If the armature current exceeds 500A, transistor Q3 will conduct and apply a ONE input signal to inverting gate $A_6$. The resulting ZERO output from gate $A_6$ is applied to gate $G_1$ and results in a full field current output signal from the field current output amplifier. This signal should quickly reduce the value of armature current below the 500A level and thereby cause transistor Q3 to return to its normally blocking condition. If this does not occur, it indicates a malfunction of the control circuitry. In this cause the same series of events involving gates $P_6$, $O_3$ and the trip flip-flop $O_4$-$P_5$ as described above for the overspeed condition, will result in opening contractors L, S and M.

The output signal from operational amplifier IC-1b is applied to comparator $Q_4$-$Q_5$ by means of resistors R19 and R20. The values of resistors R19 and R20 are selected so that transistors Q4 will be blocked only if a substantial regenerative current of at least −10A is flowing. Thus, for zero or positive armature current, transistor Q4 will be conducting and Q5 will be blocked. This provides a ZERO input to gate $A_5$ which produces a ONE signal at its output. This output signal is called IPLUS and indicates a near zero or positive armature current value.

If the motor was started without a field signal being present, excessive values of armature current would be drawn. To prevent this condition, a field current must be present having a value equal to the maximum regulated value of 8A. When this value is present, the signal MAXF will be a ONE. This signal, in addition to the signal T = ONE, must be present at the input of gate $G_2$ in order to set flip-flop $F_1$-$J_1$, which results in starting the motor.

If the motor is subjected to high currents for a continuing period, such as would be the case for climbing an exceptionally long, steep grade, the motor may overheat to a point where it is necessary to cut back on the maximum available armature current even though the performance of the vehicle is appreciably degraded. A temperature sensor placed in the motor is used to sense a condition of excessive temperature. Under overtemperature conditions this sensor will apply a 12V signal though resistor R153 to transistor Q39. This signal will cause transistor Q39 to conduct and in effect place resistor R154 in parallel with resistor R14. This will result in increasing the gain of operational amplifier IC-1b. This will result in an increase in the armature current feedback signal for a given level of armature current. Since the armature feedback signal is compared with the armature reference signal, this will result in reducing the actual armature current to the motor. The motor will therefore dissipate less heat although the performance of the vehicle will be adversely affected. Under normal conditions resistor R159 will keep transistor Q39 in a blocking condition and R154 will not influence the operation of the circuit.

(8) POWER SUPPLY

The power supply 8 operates from the nominal 48V battery connection. Capacitor C26 serves to filter out transient voltage spikes. When the batteries are badly discharged, the actual value of this voltage may drop as low as 27V. During regenerative conditions the voltage may rise as high as 60V. This supply is designed to provide regulated voltages of +22V, +14V, +12V and +11V even though the input voltage varies over the wide range indicated above. Furthermore, the +11V voltage, which is used to represent a virtual ground or zero reference signal for the control, is designed to be exactly one-half of the 22V voltage. This is accomplished by comparing the 11V signal with a signal representing one-half of the 22V signal as provided by resistors R80 and R77. This comparison takes place in operational amplifier IC-5b, the output of which drives amplifying transistor Q14. Q14 is coupled to a series regulating transistor Q12 by means of diode D25 and resistors R81 and R82. Transistor Q12 is made to conduct just enough current to maintain the value of the 22V output from its emitter to be equal to twice the value of the 11V reference. As the value of the 48V signal changes, the current drawn through resistor R81 is changed to compensate for changes in the current in resistor R82.

The +11V and +14V voltages are derived through a Zener-diode, diode regulating chain consisting of Zener-diode D27 and diodes D28, D29, D30 and D31 and resistor R83. The base of transistor Q13 is connected into this regulating chain. The voltage from its emitter is used to supply the +12V voltage to the logic circuitry. Transistor Q13 isolates the fluctuating demand current drawn by this logic from the Zener-diode, diode chain. Capacitors C27, C28 and C29 are used to bypass to ground the +22V, +12V and +11V supplies respectively.

The disclosed invention has several advantages over the prior art such as switching from the low voltage battery connection to the high voltage battery connection as soon as possible. This provides best performance, higher available torque and increases efficiency. The disclosed system takes into account various conditions of the battery and switches sooner to the higher voltage condition for low battery voltage. The disclosed electrical system also takes into account the current demand and switches to the high voltage condition sooner for a heavy current demand. The disclosed system remains in a high voltage connection as long as feasible and provides regeneration as long as practical.

I claim:

1. An electric vehicle comprising:
    a direct current drive motor;
    a separately excited field winding disposed within said direct current drive motor;
    a direct current power supply;
    connecting means for connecting said direct current power supply to the armature of said direct current drive motor switchable between an open position disconnecting said direct current power supply from said direct current drive motor and a closed position connecting said direct current power supply to said direct current drive motor;
    field control means connected to said separately excited field winding for supplying field excitation in response to operator control and vehicle operating parameters;
    motor overspeed control means connected to said field control means for limiting the maximum speed of said direct current drive motor by causing said field control means to supply at least full rated field current to said separately excited field winding when the speed of said direct current drive motor exceeds a predetermined value.

2. An electric vehicle as claimed in claim 1, wherein:
    said motor overspeed control means causes said field control means to supply at least full rated field current when the speed of said direct current drive motor exceeds a predetermined value and maintain at least full rated field current until the speed of said direct current drive motor falls below a predetermined value.

3. An electric vehicle as claimed in claim 1, including:
    armature current sensing means connected to said direct current drive motor for sensing armature current flowing through said direct current drive motor; and,
    said motor overspeed control means comprising armature current comparator means connected between said armature current sensing means and said connecting means for determining if armature current becomes negative after at least full rated field current is applied to said separately excited field windings, and if armature current does not become negative within a preselected time to cause said connecting means to disconnect said direct current power supply from said direct current drive motor.

4. An electric vehicle as claimed in claim 1 comprising:
    a speed transducer connected to provide an output voltage proportional to the speed of said direct current drive motor;
    a voltage comparator for comparing the output voltage of said speed transducer with a predetermined voltage level equivalent to the maximum motor speed desired and supplying an output signal when the maximum direct current drive motor speed is exceeded;
    said field control means being connected to said voltage comparator to supply full field current when an output signal is received from said voltage comparator.

5. An electric vehicle as claimed in claim 4, including:
a shunt connected in series with said direct current drive motor for supplying an output signal proportional to the armature current flow through said direct current drive motor; and,
a second voltage comparator connected to the output of said shunt for supplying an output signal when said armature current is positive indicating regenerative current is not flowing and being connected to said connecting means to supply a signal to cause said connecting means to open when said field control means is supplying full field current and said armature current is positive.

6. An electric vehicle as claimed in claim 5, including:
a time delay disposed between said second comparator and said connecting means to delay the signal to open said connecting means for a predetermined time so that said direct current power supply is not disconnected from said direct current drive motor when full-field current is supplied and the armature current remains positive until a predetermined time lapses.

7. An electric vehicle as claimed in claim 1, comprising:
a throttle connected to supply a signal to said field control means proportional to the positioning of said throttle; and,
brake means connected to said field control means for cancelling throttle signal and demanding regenerative armature current when depressed.

8. An electric vehicle as claimed in claim 1 comprising:
armature current sensing means connected to said direct current drive motor for supplying a signal proportional to the value of armature current flowing through said direct curent drive motor;
armature current limiting means connected to said armature current sensing means and said field control means causing said field control means to apply full-field current to said separately excited field when armature current exceeds a predetermined value.

9. An electric vehicle as claimed in claim 1, comprising:
field current sensing means connected to supply an output signal proportional to the current flowing through said separately excited field winding;
field current limiting means connected to said field control means and said field current sensing means to limit field current to some maximum value; and,
field current supply means connected to said field control means causing said field control means to supply current pulses having some minimum predetermined durations to said separately excited field windings.

10. An electric vehicle as claimed in claim 1 comprising:
temperature sensing means connected to said direct current drive motor for measuring the temperature of said direct current drive motor and providing an indication when the temperature of said direct current drive motor exceeds a predetermined value; and,
armature current limiting means connected in the circuit to said direct current drive motor for reducing the value of armature current when an indication is provided from said temperature sensing means.

11. An electric vehicle comprising:
a direct current drive motor;
a separately excited field winding disposed within said direct current drive motor;
a direct current power supply;
connecting means for connecting said direct current power supply to the armature of said direct current drive motor;
a throttle connected to supply a signal proportional to its positioning;
field control means connected to said throttle and said separately excited field winding for supplying field excitation in response to the signal from said throttle;
a brake connected to said field control means for cancelling any throttle signal and demanding a regenerative armature current when depressed; and
motor overspeed control means connected to said field control means for limiting the maximum speed of said direct current drive motor by causing said field control means to supply a predetermined field current to said separately excited field winding when the speed of said direct current drive motor exceeds a predetermined value.

12. An electric vehicle as claimed in claim 11 comprising:
switching means disposed between said throttle and said field control means switchable between a closed position feeding the signal of said throttle to said field control means and an open position blocking any input signal from said throttle to said field control means;
said switching means connected to said brake pedal to be activated when said brake pedal is depressed causing the throttle signal to said field control means to be blocked.

13. An electric vehicle comprising:
a direct current drive motor;
a separately excited field winding disposed within said direct current drive motor;
a direct current power supply for powering said electric vehicle;
armature current sensing means connected to said direct current drive motor for sensing the value of armature current flowing through said direct current drive motor;
field control means connected to said separately excited field winding for supplying field excitation;
armature current limiting means connected to said armature current sensing means and said field control means for causing said field control means to apply full-field current to said separately excited field windings when armature current exceeds a predetermined level;
connecting means switchable between a closed position supplying power to said direct current drive motor and an open position disconnecting said direct current power supply from said direct current drive motor in response to a signal from said armature current limiting means;
said armature current limiting means connected to supply a signal to said connecting means causing said connecting means to switch to the open position when armature current exceeds a predetermined level; and,
a time delay connected between said armature current limiting means and said connecting means to delay the signal from said armature current limiting means to said connecting means so said connecting means is switched to the open position a predetermined time after said armature current exceeds and remains above a predetermined level.

14. An electric vehicle comprising:
a direct current drive motor;
a separately excited field winding disposed within said direct current drive motor;
a direct current power supply for powering said electric vehicle;
armature current sensing means connected to said direct current drive motor for sensing the value of armature current flowing through said direct current drive motor;
field control means connected to said separately excited field winding for supplying field excitation;
armature current limiting means connected to said armature current sensing means and said field control means for causing said field control means to apply full-field current to said separately excited field windings when armature current exceeds a predetermined level;
throttle means providing an output signal proportional to positioning of said throttle means;
switching means connecting the signal of said throttle means to said field control means and being switchable between a closed position feeding the output signal of said throttle means to said field control means and at an open position blocking the signal from said throttle means to said field control means; and,
said armature current limiting means providing an output signal to said switching means to switch said switching means to the open position when said armature current exceeds a predetermined level.

15. An electric vehicle comprising:
a direct current drive motor;
a separately excited field winding disposed within said direct current drive motor;
field control means connected to said separately excited field winding for supplying field excitation;
said field control means supplying selected current pulses in response to throttle settings and vehicle operating parameters to said separately excited field windings;
minimum field current supply means connected to said field control means causing said field control means to supply current pulses having some minimum predetermined duration;
maximum field current supply means connected to said field control means for limiting field current to some maximum value;
a direct current power supply;
connecting means for connecting said direct current power supply to said direct current drive motor; and,
full-field means connected to said field control means causing said field control means to supply a selected field current to said separately excited field windings before said connecting means connect said direct current power supply to said direct current drive motor.

16. An electric vehicle comprising:
a direct current drive motor;
a separately excited field winding disposed within said direct current drive motor;
field control means connected to said separately excited field winding for supplying field excitation;
said field control means supplying selected current pulses in response to throttle settings and vehicle operating parameters to said separately excited field windings;
minimum field current supply means connected to said field control means causing said field control means to supply current pulses having some minimum predetermined duration;
throttle means comprising a throttle pedal and providing a signal proportional to said throttle pedal setting to said field control means; and,
said throttle means comprising throttle release means connected to said field control means causing said field control means to supply regenerative armature current when said throttle pedal is less than a predetermined amount depressed.

17. An electric vehicle comprising:
a direct current drive motor;
a separately excited field winding disposed within said direct current drive motor;
a direct current power supply;
connecting means for connecting said direct current power supply to the armature of said direct current drive motor;
temperature sensing means connected to said direct current drive motor for sensing the temperature of said direct current drive motor and providing an excess temperature output signal when the temperature of said direct current drive motor exceeds a predetermined value;
a throttle,
field control means connected to said throttle and said separately excited field winding for supplying field excitation in response to a signal from said throttle and,
said temperature sensing means being connected to reduce the value of the maximum armature current which can be supplied.

18. An electric vehicle as claimed in claim 17 comprising:
an armature current feedback means for providing feedback signal proportional to armature current;
comparator means for comparing the signal from said armature current feedback means with the signal from said throttle means and providing a demand signal to said field control means representing the desired armature current;
amplifier means connected in the connection of said armature current feedback means to said comparator means and having a gain controlled by said temperature sensing means to increase the value of the armature current feedback signal when the temperature of said direct current drive motor exceeds a predetermined value and thereby reduce the actual value of the armature current supplied by said field control means for any given throttle setting.

* * * * *